US007891623B2

(12) United States Patent
Haddad et al.

(10) Patent No.: US 7,891,623 B2
(45) Date of Patent: Feb. 22, 2011

(54) STOWABLE CUP HOLDER TRAY ASSEMBLY

(75) Inventors: Michel E. Haddad, Troy, MI (US); Steven E. Morris, Fair Haven, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1142 days.

(21) Appl. No.: 11/425,401

(22) Filed: Jun. 21, 2006

(65) Prior Publication Data

US 2007/0295875 A1    Dec. 27, 2007

(51) Int. Cl.
A47K 1/08    (2006.01)
(52) U.S. Cl. .............. 248/311.2; 224/926; 296/24.34; 312/242
(58) Field of Classification Search .............. 248/311.2; 296/24.34, 37.8, 37.14, 1.09; 224/275, 537, 224/926; 312/242, 276, 321.5
See application file for complete search history.

(56) References Cited

U.S. PATENT DOCUMENTS

| 4,828,211 | A  | * | 5/1989  | McConnell et al. ...... 248/311.2 |
| 5,601,268 | A  | * | 2/1997  | Dunchock ................ 248/311.2 |
| 6,435,633 | B2 | * | 8/2002  | Hoshi ..................... 312/242 |
| 6,439,525 | B1 | * | 8/2002  | Gehring et al. .......... 248/311.2 |
| 6,830,276 | B2 | * | 12/2004 | Johansson, Sr. ......... 296/24.34 |
| 7,114,755 | B1 | * | 10/2006 | Sturt et al. .............. 296/24.34 |
| 7,147,259 | B2 | * | 12/2006 | Radu et al. .............. 296/24.34 |
| 7,264,291 | B2 | * | 9/2007  | Radu et al. .............. 296/24.34 |

FOREIGN PATENT DOCUMENTS

| DE | 8418140   | U1 | 9/1984  |
| DE | 3711001   | A1 | 10/1988 |
| DE | 4237855   | C1 | 4/1994  |
| DE | 19956366  | C2 | 12/2002 |
| DE | 10260502  | A1 | 7/2004  |

* cited by examiner

Primary Examiner—Gwendolyn Baxter
(74) Attorney, Agent, or Firm—Quinn Law Group, PLLC

(57) ABSTRACT

A stowable cup holder tray assembly is provided for a vehicle having an interior floor structure. The cup holder assembly includes a stowage compartment having a bottom portion with a plurality of opposing sidewalls extending therefrom and defining a stowage volume. The stowage compartment is mounted substantially adjacent to the interior floor structure. A cover member is hinged to one of said plurality of opposing sidewalls and operates to substantially close said stowage volume. A cup holder tray member is movable between a stowed position and a deployed position. The stowage volume is sufficiently configured to receive said cup holder tray member when in said stowed position. A vehicle incorporating the disclosed cup holder tray assembly is also provided. The cup holder tray assembly is configured to be sufficiently close to the floor when in the stowed position to provide limited barriers within the interior of the vehicle.

14 Claims, 5 Drawing Sheets

US 7,891,623 B2

STOWABLE CUP HOLDER TRAY ASSEMBLY

TECHNICAL FIELD

The present invention relates to a cup holder tray assembly for a vehicle.

BACKGROUND OF THE INVENTION

Traditionally, vehicles have been provided with cup holders sufficiently configured to retain a beverage container for the convenience of the occupants of the vehicle. These cup holders may be mounted to a dash panel, door, or center console of the vehicle. The center console is typically a stationary member positioned between seat assemblies. The center console defines a volume for storage of items and may include one or more cup holders. The center console, although convenient for storage, may limit the passage between the seat assemblies by the occupants of the vehicle.

SUMMARY OF THE INVENTION

A stowable cup holder tray assembly is provided for a vehicle having an interior floor structure and at least one seat assembly mounted thereto. The at least one seat assembly includes a lower seat member. The cup holder assembly includes a stowage compartment having a bottom portion with a plurality of opposing sidewalls extending therefrom and defining a stowage volume. The stowage compartment is mounted substantially adjacent to the interior floor structure. A cover member, preferably formed from impact resistant plastic, is hinged to one of the plurality of opposing sidewalls and operates to substantially open and close the stowage volume. A cup holder tray member is movable between a stowed position, substantially within the stowage volume, and a deployed position, substantially out of the stowage volume. The stowage volume is sufficiently configured to receive the cup holder tray member when substantially in the stowed position.

The stowable cup holder tray assembly may be disposed substantially adjacent to at least one interior seat assembly of the vehicle. The stowage compartment may be mounted in one of substantially below, partially below, and above the interior floor structure. At least one ramp may be disposed adjacent to one of the plurality of sidewalls to provide a transition between the interior floor structure and the stowage compartment. The stowable cup holder tray assembly is sufficiently below the height of the lower seat member when the cup holder tray member is in the stowed position to improve the cargo carrying capacity of the vehicle as well as to provide unobstructed movement for occupants of the vehicle.

In a first embodiment, the cover member is configured to selectively lock at a substantially right angle with respect to the interior floor structure. Additionally, the cup holder tray member is hinged to the cover member and sufficiently configured to selectively lock at a substantially right angle to the cover member such that the cup holder tray member is generally parallel with respect to the interior floor structure when the cup holder tray member is in the deployed position.

In another embodiment, first and second track members are mounted with respect to a first and second of the plurality of opposing sidewalls. Additionally, first and second rod members are pivotably disposed with respect to each other, wherein each of the first and second rod members has a first and second end portion. The first end portions of the first and second rod members are pivotably mounted to the cup holder tray member and the second end portions of the first and second rod members are slidably retained within the first track member. Also provided are third and fourth rod members pivotably disposed with respect to each other, wherein each of the third and fourth rod members have a first and second end portion. The first end portions of the third and fourth rod members are pivotably mounted to the cup holder tray member and the second end portions of the third and fourth rod members are slidably retained within the second track member. At least one of the second end portions of the first and second rod members and/or at least one of the second end portions of the third and fourth rod members are selectively lockable within a respective one of the first and second track members to selectively maintain the cup holder tray member is in the deployed position.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
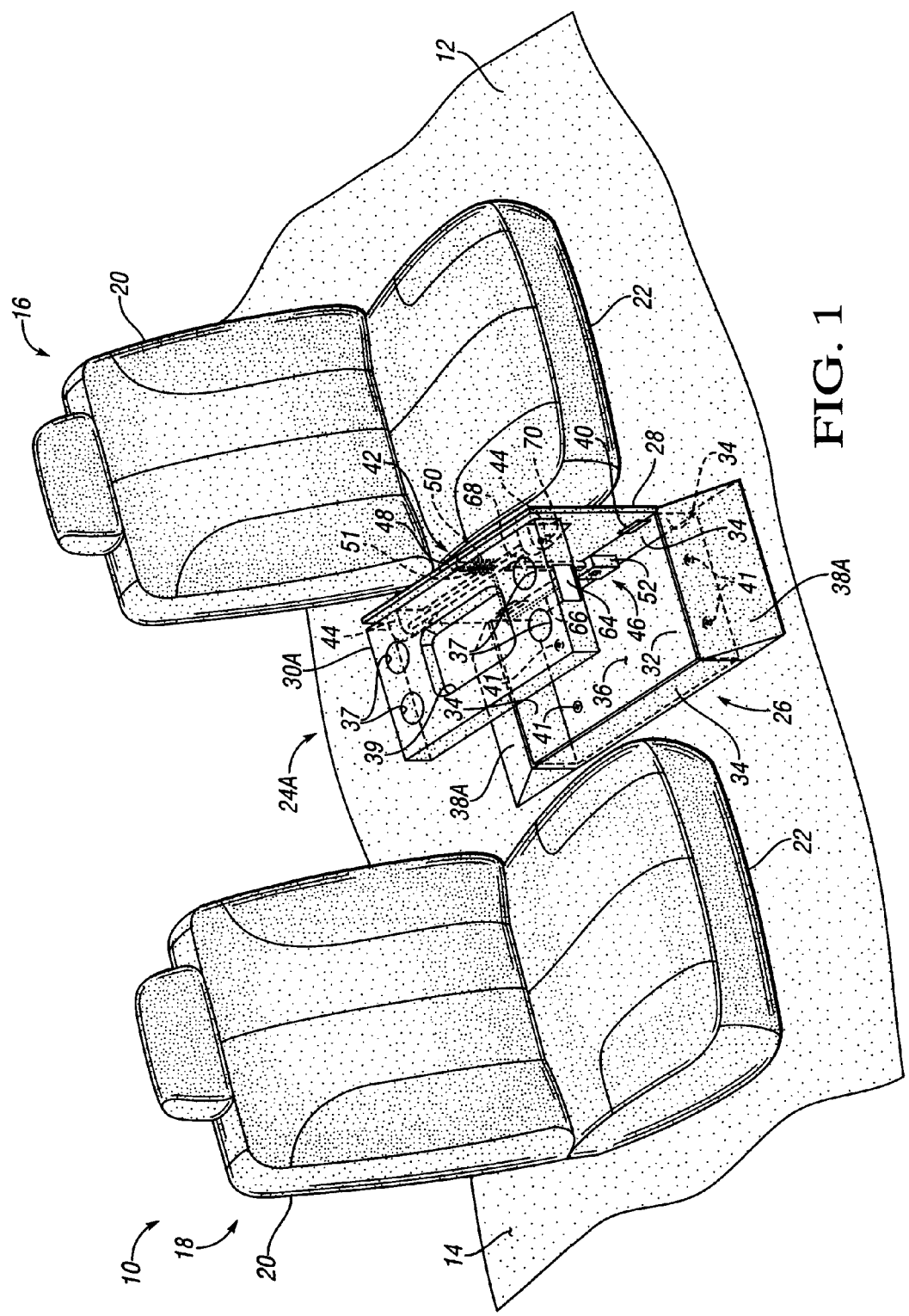
FIG. 1 is a perspective view of a portion of a vehicle illustrating a stowable cup holder tray assembly, having a cup holder tray member shown in a deployed position, mounted with respect an interior floor structure at least partially defining the vehicular interior volume.

Referring to the drawings wherein like reference numbers correspond to like or similar components throughout the several figures, there is shown in FIG. 1 a portion of a vehicle 10 such as, for example, a mini-van, sport utility, conversion van, etc. The vehicle 10 includes an interior floor structure 12, which operates to at least partially define an interior volume 14. A first and second seat assembly 16 and 18, respectively, is mounted with respect to the interior floor structure 12. The first seat assembly 16 and second seat assembly 18 are spaced from each other and may constitute a first vehicle seating row or a second vehicle seating row. When configured as a first vehicle seating row, the first seat assembly 16 may function as the driver's seat upon which the operator, not shown, of the vehicle 10 will sit to effect operation thereof. Additionally, the second seat assembly 18 may function as a passenger seat. When configured as a second vehicle seating row, each of the first and second seating assembly 16 and 18 may function as passenger seats. The first and second seat assemblies 16 and 18 include a seat back member 20 and a lower seat member 22, each of which are preferably adjustable to provide comfort to the vehicle occupants.

A stowable cup holder tray assembly 24A is disposed between the first and second seat assemblies 16 and 18. The stowable cup holder tray assembly 24A is mounted substantially adjacent to the interior floor structure 12. The stowable cup holder assembly 24A is shown in FIG. 1 with a cup holder tray member 30A in a deployed position. The stowable cup holder tray assembly 24A includes a stowage compartment 26, a cover member 28, and the cup holder tray member 30A. The stowage compartment 26 includes a bottom portion 32 having a plurality of opposed sidewall portions 34 extending therefrom. The bottom portion 32 and the plurality of opposed sidewall portions 34 cooperate to define a stowage volume 36, which is sufficiently configured to receive the cup holder tray member 30A when the cup holder tray member 30A is in a stowed position (shown in FIG. 2). The cup holder tray member 30A is preferably formed from plastic or other suitable material and defines a plurality of pockets or recesses 37. The recesses 37 are preferably configured to receive a beverage container and thereby operate as a cup holder. The cup holder tray member 30A also defines a recess 39 forming a tray portion configured to receive items such as keys, notebooks, maps, etc. A plurality of ramps 38A are disposed respectively at opposite ends of the stowage compartment 36. A plurality of screws 41 are received by the bottom portion 32 and engage the interior floor structure 12 to secure the stowable cup holder assembly 24A with respect to the interior floor structure 12. Those skilled in the art will recognize other methods of mounting the stowable cup holder tray assembly 24A such as snap fits, weldments, etc. Additionally, the stowable cup holder tray assembly 24A may be mounted to a seat frame, not shown, of at least one of the first seat assembly 16 and the second seat assembly 18.

The cover member 28 is pivotably mounted to one of the plurality of opposed sidewalls 34 by hinges 40. The cover member 28 is preferably configured to be moveable between a closed position (shown in FIG. 2) and an open position (shown in FIG. 1). In the closed position, the cover member 28 is substantially parallel to the interior floor structure 12. Alternately, when in the open position, the cover member 28 is at a generally ninety-degree angle with respect to the interior floor structure 12. Additionally a locking mechanism 42 is provided to selectively lock or retain the cover member 28 in one of the closed position and the open position. The cup holder tray member 30A is pivotably mounted with respect to the cover member 28 by a plurality of hinges 44. The cup holder tray member 30A is selectively lockable with respect to the cover member 28 by a locking mechanism 46. The cup holder tray member 30A is selectively locked at a generally ninety-degree angle with respect to the cover member 28 when the stowable cup holder tray assembly 24A is in the deployed position, shown in FIG. 1.

Figure 4:
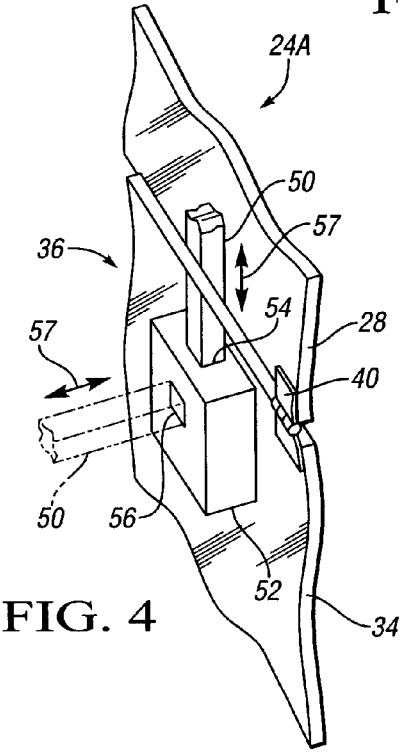
FIG. 4 is a perspective view of a portion of the stowable cup holder tray assembly of FIGS. 1 and 2 illustrating the functionality of a locking rod engagement block.

The locking mechanism 42 includes a latch mechanism 48, a locking rod member 50 biased by a coil spring 51, and a locking rod engagement block 52. The operation of the locking mechanism can best be explained with reference to FIGS. 4 and 5 and with further reference to FIG. 1. In FIG. 4 there is shown a portion of the stowable cup holder tray assembly 24A. The locking rod engagement block 52 is rigidly mounted with respect to one of the plurality of opposed sidewalls 34 and extends at least partially into the stowage volume 36. The locking rod engagement block 52 defines a first hole 54 and a second hole 56. Each of the first and second holes 54 and 56 are sufficiently configured to selectively receive at least a portion of the locking rod member 50 therein. The locking rod member 50 is translatable with respect to the cover member 28, as indicated by arrows 57.

Figure 5:
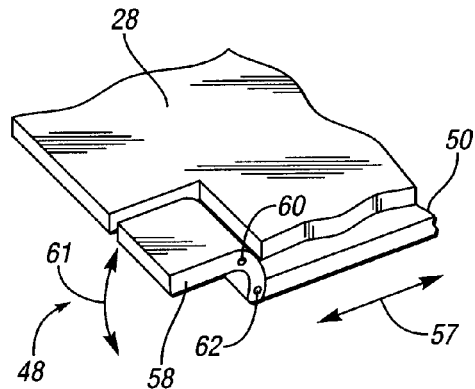
FIG. 5 is a perspective view of a portion of a cover member of the stowable cup holder tray assembly of FIGS. 1 and 2 illustrating a latch mechanism operable to selectively move a locking rod member into selective engagement with the locking rod engagement block.

With the cover member 28 in the upright open position, the locking rod member 50 is engageable with the hole 54 thereby locking the cover member 28 in the open position with respect to the stowage compartment 26. To unlock the upright cover member 28, the locking rod member 50 is extractable from the first hole 54 thereby allowing the cover member 28 to pivot about hinges 40 with respect to the sidewall 34. With the cover member 28 in the horizontal closed position, the cover member 28 may be locked when the locking rod member 50 is inserted into the second hole 56, as shown in phantom. From the foregoing discussion it is readily apparent that to lock and unlock the cover member 28 in either its open or closed positions, the locking rod member 50 is selectively inserted and extracted from the first hole 54 or second hole 56 thereby allowing the cover member 28 to pivot about hinges 40 with respect to the sidewall 34. FIG. 5 illustrates the latch mechanism 48 operable to bias the locking rod member 50 from either of the first and second holes 54 and 56, respectively. The latch mechanism 48 includes a latch handle 58. The latch handle 58 is generally L-shaped in cross section and pivots with respect to the cover member 28 about a point 60 as indicated by arrow 61. The latch handle 58 is pivotably connected to the locking rod member 50 at point 62 and operates as a bell crank to bias the locking rod member 50 such that as the latch handle 58 is pivoted about point 60 the locking rod member 50 is translated, as indicated by arrow 57. By translating the locking rod member 50, the locking rod member 50 is caused to selectively engage one of the first and second holes 54 and 56, respectively.

Referring again to FIG. 1, the locking mechanism 46 is mounted with respect to the cup holder tray member 30A and includes a button 64, a rod member 66, and a locking rod member 68. The button 64 is rigidly connected to the rod member 66, which in turn is rigidly connected to the locking rod member 68. At least one of the plurality of hinges 44 defines a hole 70 sufficiently configured to receive therein at least a portion of the locking rod member 68 thereby locking the cup holder tray member 30A with respect to the cover member 28. To unlock the cup holder tray member 30A, the button 64 is pushed to urge the rod member 66 to bias the locking rod member 68 out of engagement with the hole 70.

Figure 2:
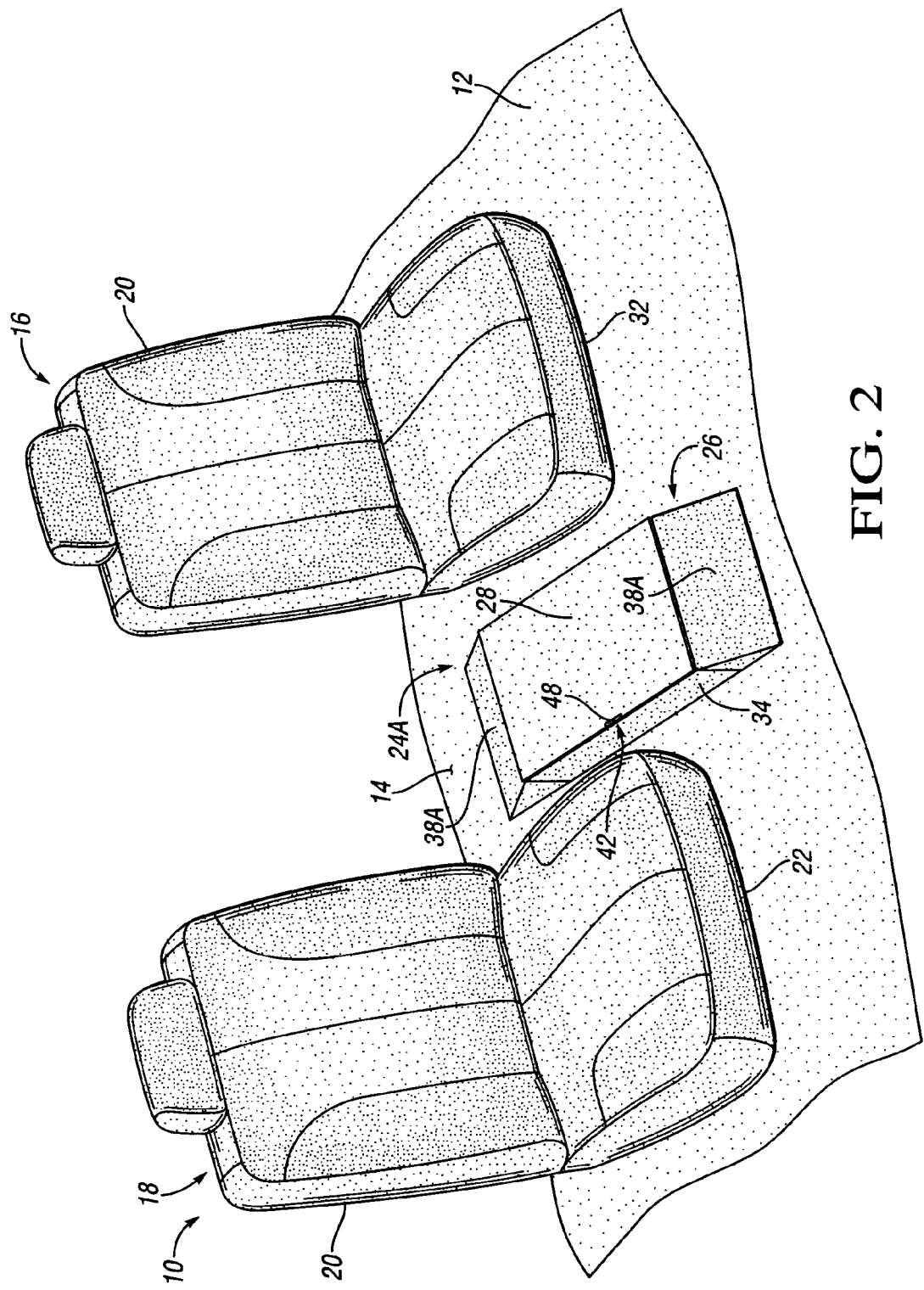
FIG. 2 is a perspective view of the vehicle portion of FIG. 1 illustrating the stowable cup holder tray member in the stowed position.
Figure 3:
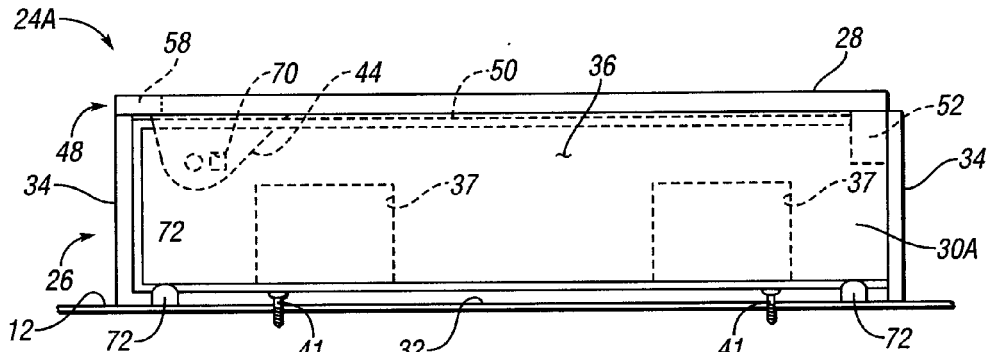
FIG. 3 is a front view of the stowable cup hold tray assembly of FIGS. 1 and 2 with the cup holder tray member shown in the stowed position.

Referring now to FIG. 2, there is shown the cup holder tray assembly 24A with the cup holder tray member 30A in the stowed position. In such a stowed position, the cup holder tray assembly 24A occupies less space than a fixed cup holder and console assembly. Therefore, occupants within the vehicle may easily pass between the first and second seat assemblies 16 and 18. Additionally, by storing or stowing the cup holder tray member 30A substantially adjacent to the interior floor structure 12, space that would otherwise have been occupied by a fixed cup holder and console assembly may be utilized as cargo volume. The cover member 28 is preferably formed from a high impact resistant plastic material with sufficient strength and durability to resist damage when stepped on by an occupant of the vehicle 10. The ramps 38A operate to smooth the transition from the interior floor structure 12 to the cover member 28. Additionally an appearance finish or surface texture may be provided on the cover member 28 to improve tractional qualities and/or aesthetics. FIG. 3 is a front view of the stowable cup holder assembly 24A with the cup holder tray member 30A in the stowed position further illustrating aspects consistent with the present invention. A plurality of pads 72 are provided within the stowage volume 36 and operate to bias the cup holder tray member 30A away from the bottom portion 32. The pads 72 operate to cushion the cup holder tray member 30A thereby reducing the likelihood of transmitted noise as a result of hard contact between the cup holder tray member 30A and the bottom portion 32 of the stowage compartment 26.

Figure 6A:
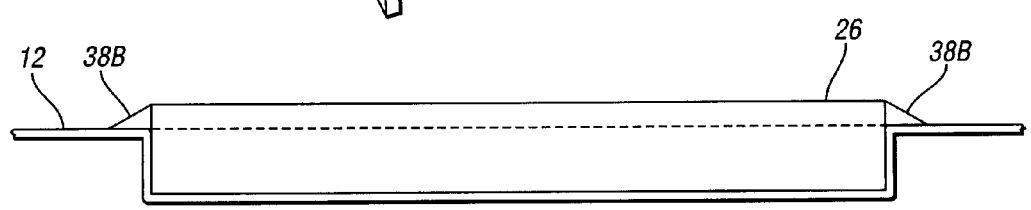
FIG. 6a is a side view of a stowage compartment of the stowable cup holder tray assembly mounted partially below the interior floor structure.
Figure 6B:
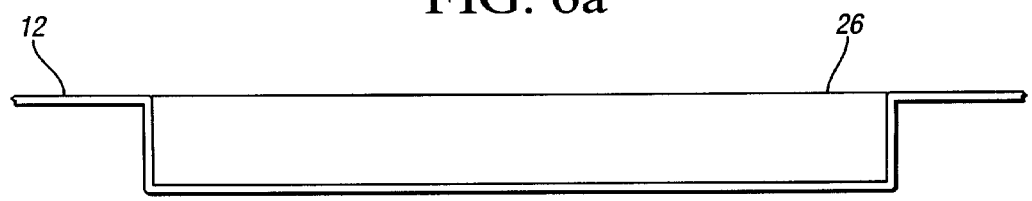
FIG. 6b is a side view of the storage compartment mounted below the interior floor structure.

Referring now to FIG. 6a, there is shown an alternate strategy for mounting the stowage compartment 26 to the interior floor structure 12. With this strategy, the stowage compartment 26 is at least partially disposed below the interior floor structure 12 of the vehicle 10. A plurality of ramps 38B are provided; however, they are reduced in size compared to ramps 38A shown in FIGS. 1, 2, 7, and 8 thereby easing the transition between the interior floor structure 12 and the portion of the stowage compartment 26 above the interior floor structure 12. FIG. 6b illustrates yet another alternate mounting strategy for mounting the stowage compartment 26 to the interior floor structure 12. With this strategy, the stowage compartment 26 is disposed below the interior floor structure 12 of the vehicle 10, thereby obviating the need for ramps 38A and 38B.

Figure 7:
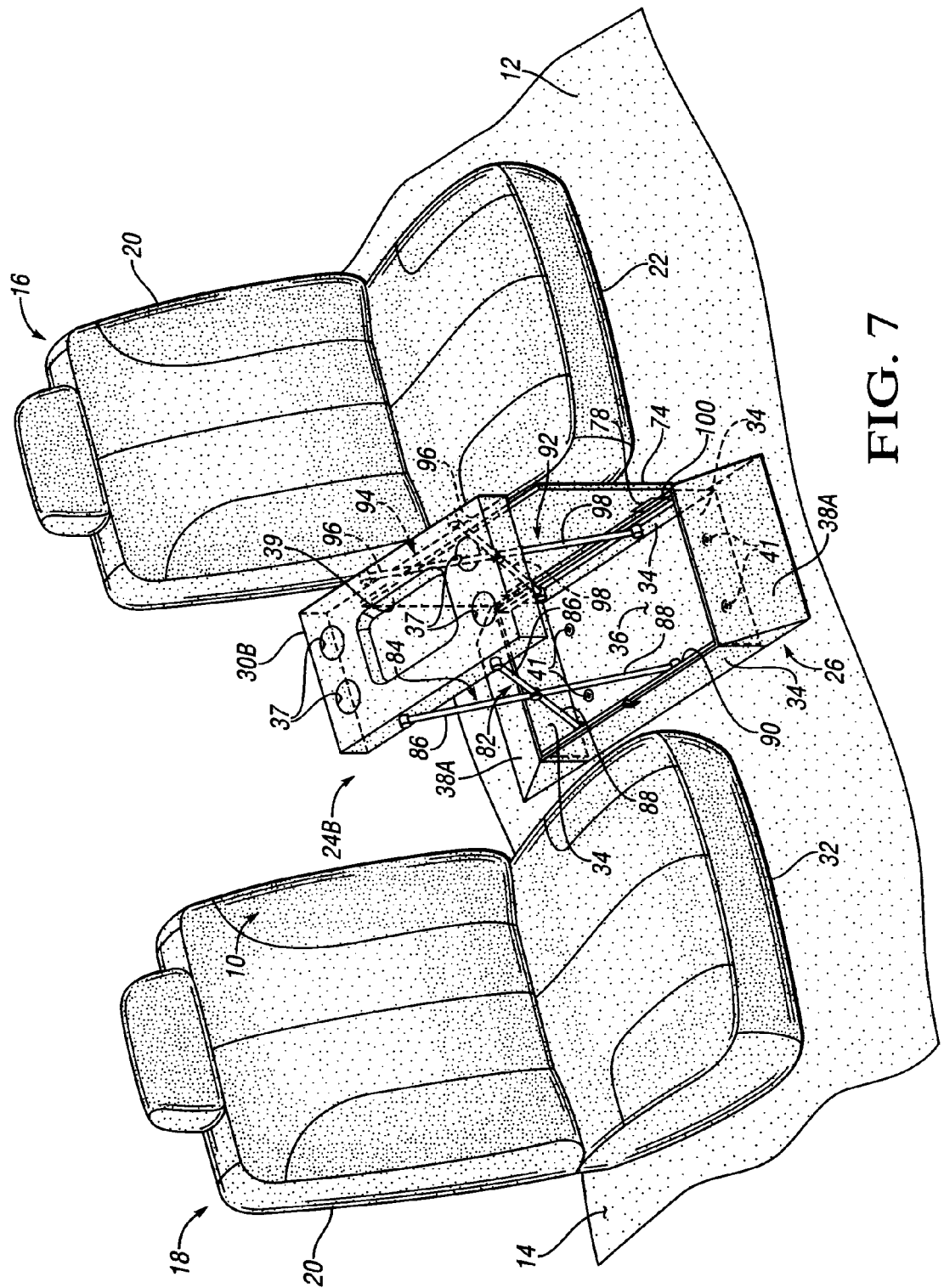
FIG. 7 is a perspective view of the vehicle portion of FIGS. 1 and 2 illustrating an alternate embodiment of the stowable cup holder tray assembly, having a cup holder tray member shown in a deployed position, disposed between the seat assemblies and mounted with respect the interior floor structure.
Figure 8:
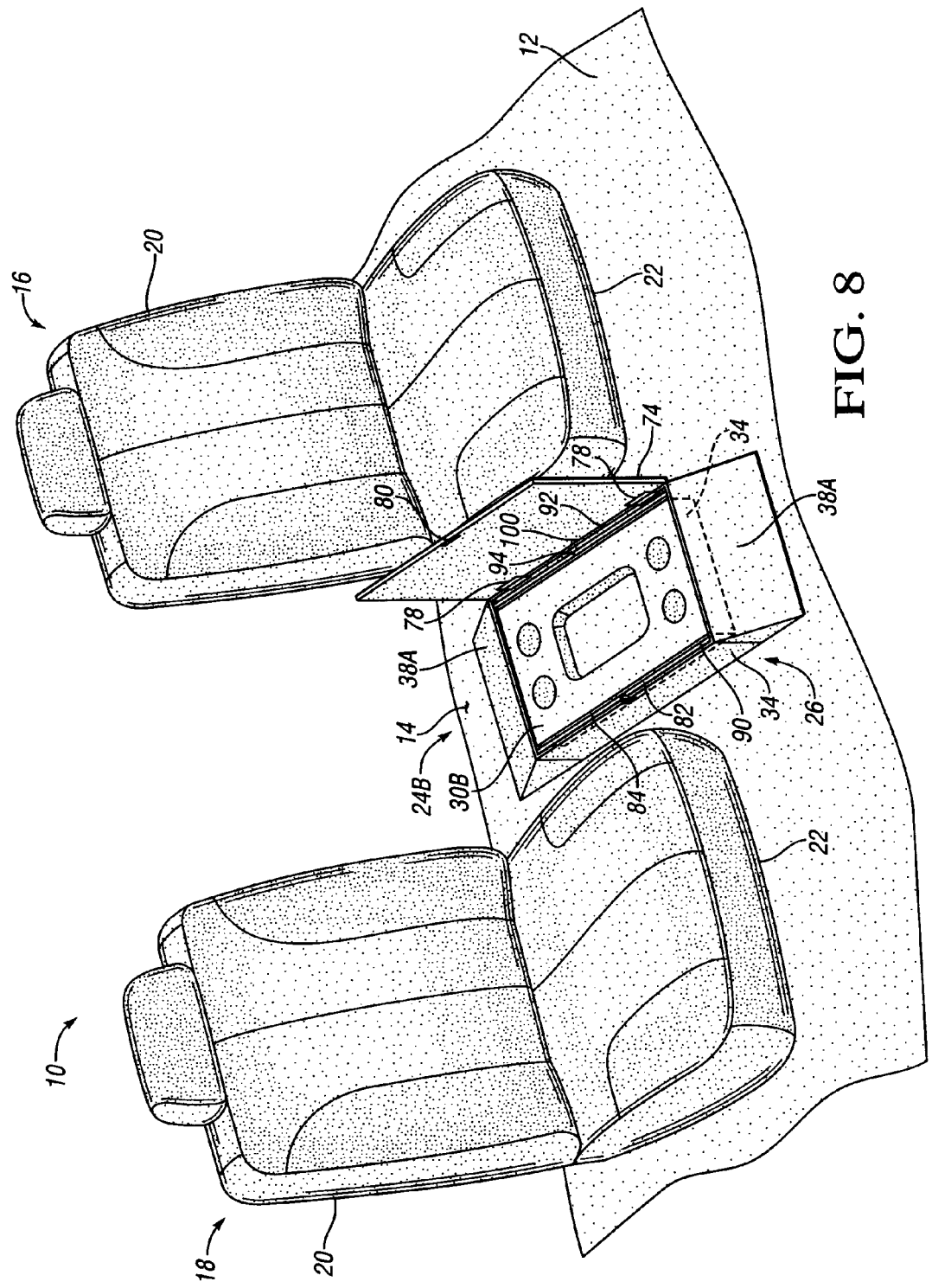
FIG. 8 is a perspective view of the vehicle portion of FIG. 7 illustrating the alternate embodiment of the stowable cup holder tray assembly illustrating the cup holder tray member in a stowed position.

Referring to FIGS. 7 and 8 there is shown a perspective view of a portion of the vehicle 10. FIG. 7 illustrates a cup holder tray assembly 24B similar to the stowable cup holder tray assembly 24A, shown in FIGS. 1 and 2. A stowable cup holder tray member 30B is selectively movable between a deployed position, shown in FIG. 7, and a stowed position, shown in FIG. 8. The stowable cup holder tray assembly 24B includes the stowage compartment 26, a cover member 74, and the cup holder tray member 30B. The cover member 74 is pivotably mounted to the stowage compartment 26 by hinges 78. The cover member operates to close the stowage volume 36, defined by the stowage compartment 26 when the cup holder tray member 30B is in the stowed position. The cover member 74 includes a latching mechanism 80, shown in FIG. 8, operable to cooperate with one of the plurality of opposed sidewalls 34 of the stowage compartment 26 to secure the cover member 74 thereto.

The stowable cup holder tray assembly 24B further includes rod members 82 and 84. The rod members 82 and 84 are pivotably mounted with respect to each other. Additionally, each of the rod members 82 and 84 includes a first end portion 86 and a second end portion 88. The first end portions 86 of the rod members 82 and 84 are pivotably mounted with respect to the cup holder tray member 30B, while the second end portions 88 of the rod members 82 and 84 are slidably disposed within a track member 90 mounted with respect to the stowage compartment 26. The stowable cup holder tray assembly 24B further includes rod members 92 and 94. The rod members 92 and 94 are pivotably mounted with respect to each other. Additionally, each of the rod members 92 and 94 includes a first end portion 96 and a second end portion 98. The first end portions 96 of the rod members 92 and 94 are pivotably mounted with respect to the cup holder tray member 76, while the second end portions 98 of the rod members 92 and 94 are slidably disposed within a track member 100 mounted with respect to the stowage compartment 26.

With the stowable cup holder tray assembly 24B in the deployed position, the rod members 82 and 84 are restrained from movement within the track member 90 using latching devices known in the art. Similarly, the rod members 82 and 84 are restrained from movement within the track member 100 using latching devices known in the art. When stowage of the cup holder tray member 30B is desired the rod members 82, 84, 92, and 94 are unlatched to allow sliding movement within their respective track members 90 and 100. The cup holder tray member 30B is then received within the stowage volume 36, as shown in FIG. 8, and covered by the cover member 74. Preferably, the cover member 74 is formed from a high impact resistant plastic for durability. Additionally, the cover 74 may be provided with a surface texture to improve tractional qualities and/or aesthetics.

The height of the stowable cup holder assemblies 24A and 24B, when in the stowed position, is lower than the height of the lower seat member 22, thus allowing ease of passage between seat assemblies 16 and 18. Additionally, the space between the seat assemblies 16 and 18 may be used for cargo thereby increasing the cargo carrying capability of the vehicle 10.

While the best modes for carrying out the invention have been described in detail, those familiar with the art to which this invention relates will recognize various alternative designs and embodiments for practicing the invention within the scope of the appended claims.

The invention claimed is:

1. A stowable cup holder tray assembly for a vehicle having an interior floor structure and at least one seat assembly mounted thereto, the cup holder assembly comprising:
   a stowage compartment having a bottom portion with a plurality of opposing sidewalls extending therefrom and defining a stowage volume;
   wherein said stowage compartment is mounted substantially adjacent to the interior floor structure;
   a cover member hinged to one of said plurality of opposing sidewalls and operable to substantially open and close said stowage volume;
   a cup holder tray member movable between a stowed position substantially within said stowage volume and a deployed position substantially out of said stowage volume;
   wherein said stowage volume is sufficiently configured to receive said cup holder tray member when substantially in said stowed position;
   wherein the stowable cup holder tray assembly is disposed substantially adjacent to the at least one seat assembly of the vehicle;
   wherein the at least one seat assembly includes a lower seat member and wherein the stowable cup holder tray assembly is sufficiently below the height of said lower seat member when said cup holder tray member is in said stowed position to increase the cargo carrying capacity of the vehicle as well as to provide unobstructed movement for occupants of the vehicle;
   wherein the cup holder tray member is aligned substantially above the stowage volume when the cup holder tray member is in the deployed position;
   wherein said cover member is configured to selectively lock at a substantially right angle with respect to the interior floor structure;
   wherein said cup holder tray member is hinged to said cover member and sufficiently configured to selectively lock at a substantially right angle to said cover member such that said cup holder tray member is generally parallel with respect to the interior floor structure when said cup holder tray member is in said deployed position;
   a first locking mechanism, wherein said first locking mechanism is operable to selectively lock said cover member at a substantially right angle with respect to the one of said plurality of opposing sidewalls to which the cover member is hinged;
   a second locking mechanism operable to selectively lock said cup holder tray member at the substantially right angle to said cover member; and
   wherein the first and the second locking mechanism each include a locking rod which is selectively received within at least one hole defined by a respective one of the first and second locking mechanisms.

2. The stowable cup holder tray assembly of claim 1, wherein said stowage compartment is mounted in one of substantially below, partially below, and above the interior floor structure.

3. The stowable cup holder tray assembly of claim 1, further comprising:
at least one ramp disposed adjacent to one of said plurality of sidewalls to provide a transition between the interior floor structure and said stowage compartment.

4. The stowable cup holder tray assembly of claim 1, wherein said cover member is formed from impact resistant plastic.

5. A vehicle comprising:
an interior floor structure;
a stowable cup holder tray assembly including:
a stowage compartment having a bottom portion with a plurality of opposing sidewalls extending therefrom and defining a stowage volume;
wherein said stowage compartment is mounted substantially adjacent to the interior floor structure;
a cover member hinged to one of said plurality of opposing sidewalls and operable to substantially close said stowage volume;
a cup holder tray member movable between a stowed position and a deployed position;
wherein said stowage volume is sufficiently configured to receive said cup holder tray member when in said stowed position;
wherein the cup holder tray member is aligned substantially above the stowage volume when the cup holder tray member is in the deployed position;
wherein said cover member is configured to selectively lock at a substantially right angle with respect to said interior floor structure;
wherein said cup holder tray member is hinged to said cover member and sufficiently configured to selectively lock at a substantially right angle to said cover member such that said cup holder tray member is generally parallel with respect to said interior floor structure when said cup holder tray assembly is in said deployed position;
a first locking mechanism, wherein said first locking mechanism is operable to selectively lock said cover member at a substantially right angle with respect to the one of said plurality of opposing sidewalls to which the cover member is hinged;
a second locking mechanism operable to selectively lock said cup holder tray member at the substantially right angle to said cover member; and
wherein the first and the second locking mechanism each include a locking rod which is selectively received within at least one hole defined by a respective one of the first and second locking mechanisms.

6. The vehicle of claim 5, further comprising:
at least one seat assembly; and
wherein said stowable cup holder tray assembly is disposed substantially adjacent to said at least one interior seat of the vehicle.

7. The vehicle of claim 5, wherein said stowage compartment is mounted one of substantially below, partially below, and above said interior floor structure.

8. The vehicle of claim 5, further comprising:
at least one ramp disposed adjacent to said plurality of sidewalls to provide a transition between said interior floor structure and said stowage compartment.

9. The vehicle of claim 5, wherein said cover member is formed from impact resistant plastic.

10. The vehicle of claim 5, wherein the at least one seat assembly includes a lower seat member and wherein the stowable cup holder tray assembly is substantially below the height of said lower seat member when said cup holder tray member is in said stowed position.

11. A stowable cup holder tray assembly for a vehicle having an interior floor structure, the cup holder assembly comprising:
a stowage compartment having a bottom portion with a plurality of opposing sidewalls extending therefrom and defining a stowage volume;
wherein said stowage compartment is mounted substantially adjacent to the interior floor structure;
a cover member hinged to one of said plurality of opposing sidewalls and operable to substantially close said stowage volume;
a cup holder tray member movable between a stowed position and a deployed position;
wherein said stowage volume is sufficiently configured to receive said cup holder tray member when in said stowed position;
a first locking mechanism, wherein said first locking mechanism is operable to selectively lock said cover member at a substantially right angle with respect to the interior floor structure;
wherein said cup holder tray member is hinged to said cover member and sufficiently configured to selectively lock at a substantially right angle to said cover member such that said cup holder tray member is generally parallel with respect to the interior floor structure when said cup holder tray assembly is in said deployed position;
a second locking mechanism operable to selectively lock said cup holder tray member at the substantially right angle to said cover member; and
wherein the first and the second locking mechanism each include a locking rod which is selectively received within at least one hole defined by a respective one of the first and second locking mechanisms.

12. The stowable cup holder tray assembly of claim 11, wherein said cover member is formed from impact resistant plastic.

13. The stowable cup holder tray assembly of claim 11, further comprising:
first and second seat assemblies spaced apart from each other and having lower seat members of predetermined height;
wherein said stowable cup holder tray assembly is disposed substantially between said first and second seat assemblies; and
wherein the stowable cup holder tray assembly is sufficiently below the predetermined height of said lower seat members when said cup holder tray member is in said stowed position so that occupants may easily pass between the first and second seat assemblies.

14. The stowable cup holder tray assembly of claim 11, wherein the cup holder tray member is aligned substantially above the stowage volume when the cup holder tray member is in the deployed position.

* * * * *